May 20, 1958  C. E. DELANEY  2,835,860
OVERLOAD PROTECTION CIRCUIT FOR ELECTRIC MOTORS
Filed Nov. 13, 1956  2 Sheets-Sheet 1

INVENTOR.
Charles Edward Delaney
BY
Attorney.

United States Patent Office 2,835,860
Patented May 20, 1958

2,835,860

OVERLOAD PROTECTION CIRCUIT FOR ELECTRIC MOTORS

Charles Edward Delaney, Hartford City, Ind., assignor to Overhead Door Corporation, Hartford City, Ind.

Application November 13, 1956, Serial No. 621,816

10 Claims. (Cl. 318—473)

This invention relates to improvements in overload protection circuit for electric motors.

The principal objects of this invention are:

First, to provide a simplified circuit for protecting electric motors from overheating due to overloading and also against excess current.

Second, to provide an inexpensive overload protector circuit for three phase motors which will utilize standard single phase thermal protectors and a minimum number of lead wires between the motor and the motor control.

Third, to provide a motor protector circuit which protects both the motor windings and the thermal protectors.

Fourth, to provide a thermal protector system for electric motors which does not interfere with the reverse circuits of the motor control system.

Fifth, to provide a motor protector circuit which can be adapted for single or there phase motors.

Sixth, to provide an overload protection circuit for three phase motors which prevents the motor from operating as a single phase motor if a protector opens.

Seventh, to provide overload protection circuits and elements for an electric motor which respond both to the temperature in the motor and the amount of current delivered to the motor.

Eighth, to provide thermal overload protection for a motor that uses automatically reclosing thermal switches but which requires actuation of a switch that may be remote from the motor before the system can be reactuated.

Other objects and advantages of the invention will be apparent from a consideration of the following description and claims. The drawings, of which there are two sheets, illustrate the overload protection features of the invention applied to three phase motors connected for various modes of control.

The motor and the protective overload control system of the invention is operative for operating any driven part and especially a part which is advanced and retracted between the forward and reverse limits. Specifically the motor and circuit of the invention are designed for use in conjunction with the operating mechanism of vertically opening and closing doors.

Figure 1:
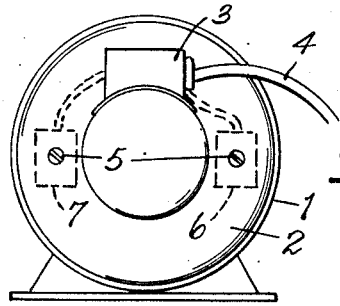
Fig. 1 is an end elevational view conventionally illustrating a motor having the overload protection elements of the invention incorporated therein.

Fig. 1 conventionally illustrates the end of an electrical motor 1 having an end bell 2 with a terminal box 3 on the outside thereof from which the current control and supply cable 4 extends. Mounted within the end bell 2 as by means of screws 5 are a pair of thermal protector switches 6 and 7, the lead wires of which are brought out through the terminal box 3 and connected as will be described in greater detail in connection with the circuit diagram shown in Figs. 2 and 3. It is pointed out that the thermal protectors 6 and 7 will be subjected to the temperature within the motor housing and thus will be responsive to overheating of the motor as well as to excess electric currents directed to the motor.

Figure 2:
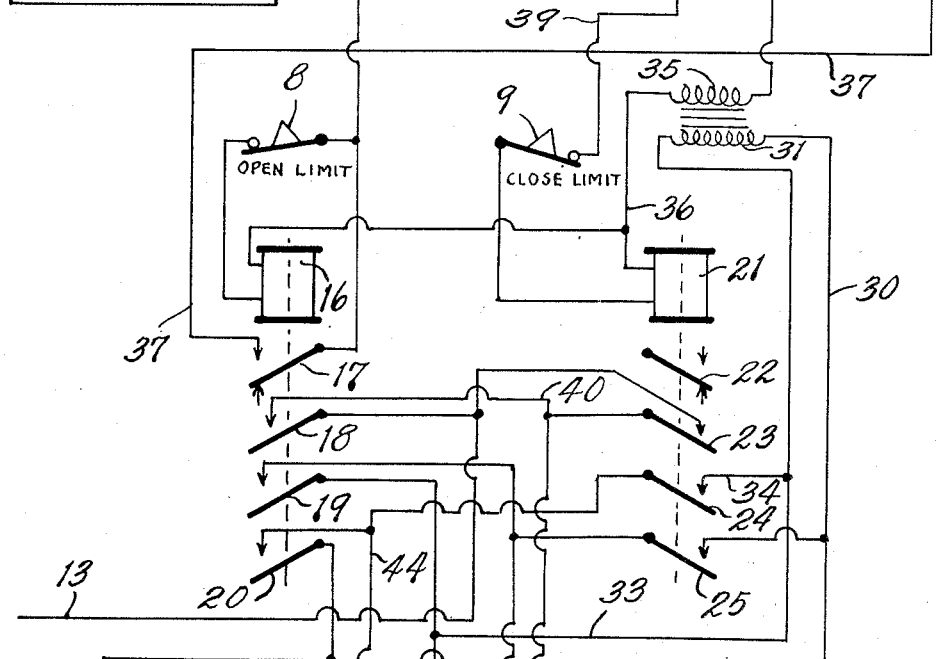
Fig. 2 is a schematic wiring diagram showing a three phase electric motor arranged for selectively forward and reverse operation upon momentary contact of forward control and upon constant closing of a reverse control button.

The circuit diagram shown in Fig. 2 illustrates the motor 1 as it may be connected to operate a vertically opening door having an open limit switch 8 and a close limit switch 9 associated therewith. A manually operated open control switch 10, a manually operated close control switch 11 and a manually operated emergency stop switch 12 may be conveniently located at a remote operating position and are connected as will be described. The limit switches and manually operated switches function in conjunction with a magnetic relay to control the supply of current to the motor from a three phase supply in supply lines 13, 14 and 15. The magnetic relay includes open control solenoid 16 actuating four movable switch contacts 17, 18, 19 and 20 and a close control solenoid 21 actuating four movable switch contacts 22, 23, 24 and 25. The movable contact 22 is not utilized in this circuit.

The thermal protectors 6 and 7 are thermally actuated switches which are currently available as commercial articles and which as shown in Fig. 2 include resistor heaters 26 connected in series with a pair of contacts 27 arranged to be opened by a bimetal actuator 28 in response to increase in temperature of the bimetal element. In the present circuit the bimetal elements 28 are subject both to the heat of the heaters 26 and the temperature within the end bell 2.

The lead wire 14 is connected through the thermal protector 6 to a conductor 29 that connects to the movable contact 20 associated with the open control solenoid 16. The conductor 29 is also connected through the conductor 30 to one side of the primary coil 31 of a transformer for supplying low voltage current to the solenoids 16 and 21. The lead wire 15 is connected through the thermal protector 7 to the conductor 32 that connects to the movable contact 19 associated with the solenoid 16. The conductor 32 also connects through the conductor 33 to the opposite side of the primary coil 31 so that the primary coil of the transformer is energized across the lead wires 14 and 15 but under the control of the thermal protectors 6 and 7. A branch 34 of the protected conductor 32, 33 is connected to the fixed contact cooperative with the movable contact 24 of the close control solenoid 21.

The primary coil 31 of the transformer energizes the low voltage secondary coil 35 that is connected on one side through the conductor 36 to each of the solenoids 16 and 21. The other side of the secondary coil is connected through the emergency stop switch to a low voltage distribution conductor 37 connected to one side of each of the open and close switches 10 and 11 and to the normally open fixed contact cooperative with the movable contact 17 of the solenoid 16. The limit switches 8 and 9 are normally closed and are opened when the door or other part to be driven reaches the desired ends of its travel. Assuming the door or part to have been stopped at an intermediate position of its travel the switches 8 and 9 will be closed as illustrated and the solenoids 16 and 21 will be disengaged as illustrated. If now the open control switch 10 is closed momentarily a low voltage circuit is completed through the conductor 38 and open limit switch 8 to the open control solenoid 16 and thence back through the conductor 36. The solenoid 16 is energized closing the contact 17 on the conductor 37 to complete a holding circuit through stop switch 12, conductor 37, contact 17 and open limit switch 8 to the solenoid 16 so that the manual control switch 10 can be released. The solenoid 16 will remain energized and the motor will continue to operate as will be described either until the open limit switch 8 is reached and automatically opened or until the emergency stop switch 12 is opened.

From the intermediate deenergized condition of the circuit as illustrated actuation of the close control switch 11 will complete a circuit through the conductor 39 and close limit switch 9 to the close control solenoid 21. No holding circuit is provided for the close control solenoid so the switch 11 must be manually held closed until the close limit switch 9 is reached and opened or until it is desired to stop the closing motion of the door. It is pointed out that opening of the limit switch 8 does not effect or interrupt the circuit to the close control solenoid 21 and conversely that opening of the close limit switch 9 does not interrupt or effect the energizing circuit to the open control solenoid 16.

Energization of the open control solenoid 16 as just described closes the movable contacts 18, 19 and 20 on their associated fixed contacts. The supply wire 13 is connected to the contact 18 and thus energizes the conductor 40 connected to one winding 41 of the three phase motor. The contact 19 being connected to the previously described conductor 32 and through it the supply wire 15 energizes the conductor 42 and through it the phase winding 43. The contact 20 being connected to the previously described conductor 29 and through it to the lead wire 14 energizes the conductor 44 and through it the third phase winding 45.

When the close solenoid 21 is energized as previously described, switch contact 23 closes on its fixed contact which is connected to lead wire 13 so that the conductor 40 energizes phase winding 41 from lead wire 13. Switch contact 24 which is connected through the conductor 44 to the phase winding 45 is closed on the conductor 34 and through the conductors 33 and 32 and thermal switch 7 to the lead wire 15. Switch contact 25 which is connected through the conductor 42 to the phase winding 43 is closed on its fixed contact that is connected to the conductor 30 and through the conductor 29 and thermal switch 6 to the lead wire 14. The motor is thus reversely energized and continues to operate so long as the close control solenoid 21 is energized.

In either forward or reverse energization of the motor for up or down motion of the door two of the three phase winding of the motor are connected through the thermal switches 6 and 7. Should either or both of the thermal switches open due to overheating in the motor or excess current in its heater coil 26 the supply connection to that phase winding will be directly interrupted. Further since the primary coil 31 of the transformer is connected across the conductors 29 and 32 to these protected phase windings the energization of the transformer will simultaneously be interrupted and the energizing current to the solenoids 16 and 21 will be cut off. The relay switches 17 to 20 and 23 to 25 will immediately open so that the motor will not operate as a single phase motor and so that the heater coil 26 of either thermal switch which may remain engaged will not be overloaded and burned out. The coils of the transformer are likewise automatically deenergized to prevent burning out the transformer.

Figure 3:
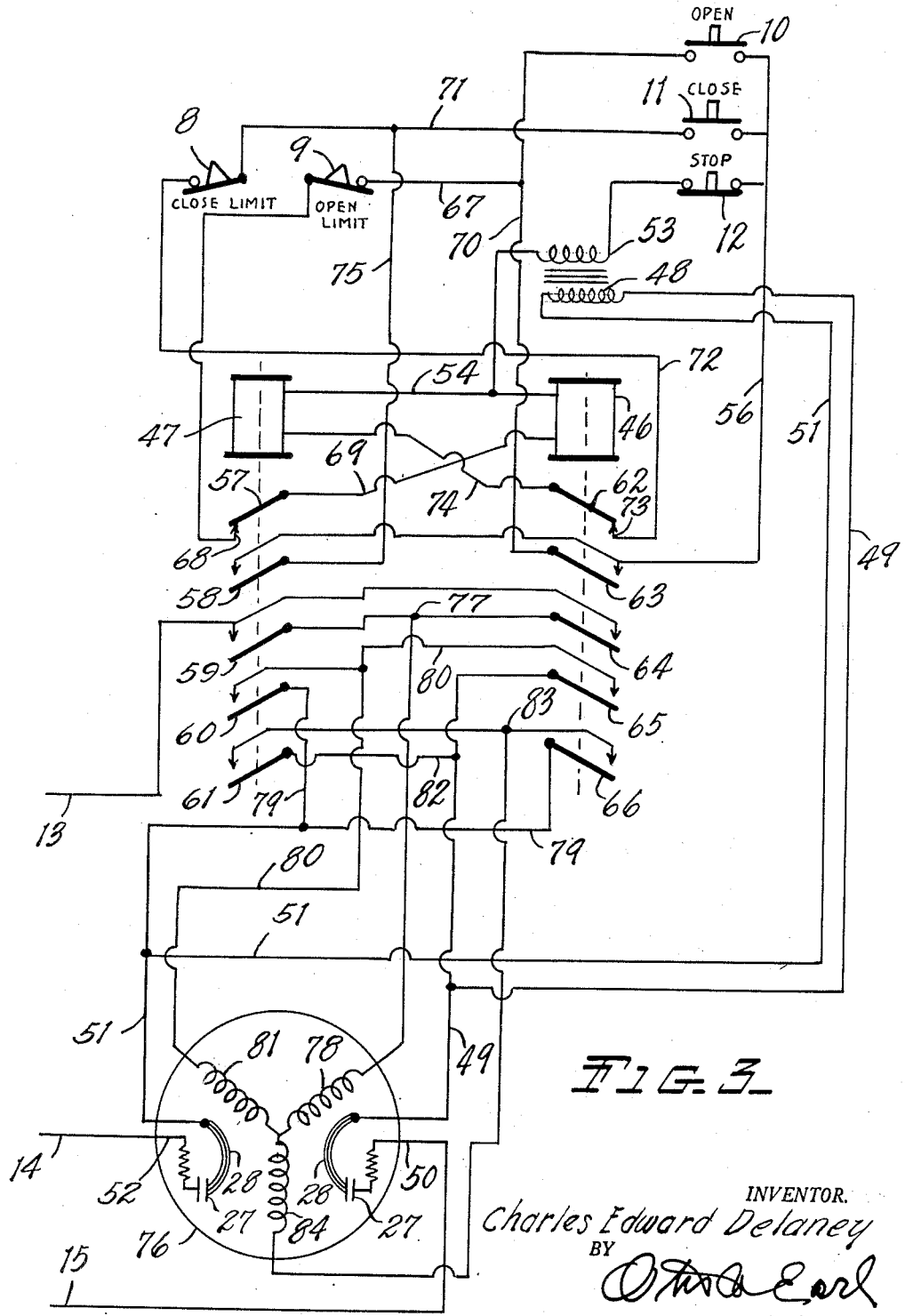
Fig. 3 is a schematic wiring diagram showing a three phase electric motor connected to operate automatically to forward and reverse limits upon momentary closing of forward and reverse control switches.

The circuit shown in Fig. 3 provides for automatic full opening or full closing of the door following momentary contact of either the open or close manual control switches. The circuit includes the same open limit switch 8, close limit switch 9, manual open control switch 10, close control switch 11 and emergency stop switch 12 as the first described circuit. The three phase supply lines are similarly numbered 13, 14 and 15.

The relay of this circuit consists of a first solenoid 46 which may be designated as the open control solenoid and a second solenoid 47 designated as the close control solenoid. The solenoids are energized from a transformer having the primary winding 48 connected through the conductor 49 and thermal switch 50 to the lead wire 15. The other side of the primary winding is connected through the conductor 51 and thermal switch 52 to the lead wire 14. The secondary winding 53 of the transformer is connected to the solenoids 46 and 47 through the conductor 54 and at its other side is connected through the stop switch 12 to a distributing conductor 56.

The solenoid 47 actuates movable switch contacts 57, 58, 59, 60 and 61 while the solenoid 46 actuates movable contacts 62, 63, 64, 65 and 66. The control circuit for forward operation of the motor to open a door extends through the open control switch 10 to a conductor 67 and through the open limit switch 9 to the normally closed fixed contact 68 associated with the movable contact 57 and from there through the conductor 69 to the open control solenoid 46. Energization of the solenoid 46 closes the contact 63 as a holding contact on the distributing conductor 56 and through the conductor 70 continues to energize the solenoid after the open control switch is released. When the door or drive part reaches its open limit the open limit switch 9 is opened to deenergize the solenoid.

The circuit for closing operation of the motor extends through the close limit switch 11 and conductor 71 to the close limit switch 8 and from there through the conductor 72 to the normally closed fixed contact 73 and conductor 74 to the close solenoid 47. Energization of the solenoid 47 closes the movable contact 58 on the distributing conductor 56 and through the conductor 75 continues to energize the solenoid until the close limit switch 8 is opened by the final closing motion of the door. The stop control switch 12 will stop either opening or closing motion of the door and the two solenoids for open and close operation cannot be energized simultaneously because the energizing circuit for each passes through a switch opened by the energization of the other.

The power circuits for operating the motor 76 are controlled by the relay switches as follows. The lead wire 13 is connected to the fixed contacts cooperative with the movable contacts 59 and 64 and when either of the solenoids is energized the actuated contact 59 or 64 energizes the conductor 77 and through it the first phase winding 78 of the motor. Movable contact 60 actuated by the solenoid 47 is connected through the conductor 79 and conductor 51 to the thermal switch 52 and lead wire 14 so that closing of the contact 60 energizes conductor 80 to the second phase winding 81. Movable contact 61 is connected through the conductor 82 to the conductor 49 and thermal switch 50 and lead wire 15 so that closing of contact 61 energizes conductor 83 to the third phase winding 84. For open operation of the door under the control of solenoid 46 closing of the contact 64 connects lead wire 13 to the conductor 77 and phase winding 78. Closing of contact 65 connects the conductor 80 and phase winding 81 to conductor 82 and thermal switch 50 and lead wire 15. Closing of contact 66 connects conductor 83 and phase winding 84 with conductor 79 and thermal switch 52 and lead wire 14.

As in the first form of the circuit two of the three phase winds of the motor are directly in series with the thermal switches 50 and 52 so that overloading or overheating of either of the thermal switches will directly disconnect one of the phase windings. The primary of the transformer is connected across these two protected phase windings and so is deenergized upon actuation of either thermal switch. Deenergization of the transformer deenergizes the holding solenoids of the electrical relay and opens all of the control switches 59, 60 and 61 and 64, 65 and 66. The motor is thus prevented from running single phase and the thermal switches and the transformer are protected against overload in the event of actuation of either of the thermal switches 50 or 52.

In both circuits as shown in Figs. 2 and 3 only seven lead wires to the motor are required yet in each case the heater coils of the thermal switches and the coils of the transformer are protected against overload because they are deenergized when either or both of the thermal switches are actuated. Each circuit prevents the motor from running single phase should either or both of the thermal switches be actuated as has been pointed out.

The circuits disclosed have an additional important advantage in that inexpensive automatically resetting thermal switches may be used without danger of having the driven part start up unexpectedly after actuation of the protective devices. Since the holding energy and circuits to the solenoids are interrupted by opening of any one of the thermal switches the entire system reverts automatically to a deenergized, at rest condition and automatic reclosing of the thermal switch upon cooling cannot, in and of itself reenergize any of the circuits. An immediate result of this condition is that the manual control switches of the system can be used as reset switches for the system and it is not necessary to climb up to the motor to reset a manually resettable thermal switch. All that is necessary is to give the thermal switches time to cool and reclose and then push either the open or close buttons.

While three phase motors and circuits have been illustrated and described, the system is adaptable to single phase motors as will be understood.

Having thus described the invention, what is claimed as new and is desired to be secured by Letters Patent is:

1. A motor control system comprising a motor having running windings, a thermal switch having a heater associated therewith and positioned in said motor to be subject to the heat of the motor and the heater, a relay including power switches connected to energize said motor and a holding circuit arranged to hold the relay in actuated motor energizing position, power leads connected through said heater and said thermal switch and said power switches to said windings, and a circuit for energizing the solenoid of said relay and said holding circuit connected to said power leads through said heater and said thermal switch ahead of said power switch, and manually operable start and stop switches in said holding circuit that may be located remotely from said motor, said thermal switch being automatically closable on temperature drop to a predetermined valve.

2. A motor control and protector system comprising a motor having three phase windings, a set of switches connected to energize said windings for operation of the motor, a solenoid arranged when energized to actuate said set of switches, a first thermal switch having an associated heater coil associated therewith and positioned within said motor, a first phase power lead connected in series through said heater coil to one switch of said set of switches, a second thermal switch having a second heater coil associated therewith and positioned within said motor, a second phase power lead connected in series through said second heater coil to a second switch of said set of switches, energizing leads for said solenoid connected in series through said thermal switches and said heater coils to said first and second power leads, and a third phase power lead connected to a third switch of said set of switches.

3. A motor control and protector system comprising a motor having three phase windings, a set of switches connected to energize said windings for operation of the motor, a solenoid arranged when energized to actuate said set of switches, a first thermal switch having an associated heater coil associated therewith and positioned within said motor, a first phase power lead connected in series through said heater coil to one switch of said set of switches, a second thermal switch having a second heater coil associated therewith and positioned within said motor, a second phase power lead connected in series through said second heater coil to a second switch of said set of switches, a third phase power lead connected to a third switch of said set of switches, and an energizing circuit for said solenoid connected in series through one of said thermal switches and its heater coil to said power leads.

4. A motor control and protector system comprising a motor having three phase windings, a set of switches connected to energize said windings for operation of the motor, a solenoid arranged when energized to actuate said set of switches, a first thermal switch having an associated heater coil associated therewith and positioned within said motor, a first phase power lead connected in series through said heater coil to one switch of said set of switches, a second thermal switch having a second heater coil associated therewith and positioned within said motor, a second phase power lead connected in series through said second heater coil to a second switch of said set of switches, a third phase power lead connected to a third switch of said set of switches, and an energizing circuit for said solenoid connected in series through one of said thermal switches to said power leads.

5. A motor control and protector system comprising a motor having three phase windings, two sets of switches connected to selectively energize said windings for forward and reverse operation of the motor, a relay including solenoids arranged when energized to selectively actuate said sets of switches, a first thermal switch having a heater coil associated therewith and positioned within said motor, a first phase power lead connected in series through said heater coil and thermal switch to one switch of each set of said switches, a second thermal switch having a second heater coil associated therewith and positioned within said motor, a second phase power lead connected in series through said second heater coil and second thermal switch to other switches of each of said sets of switches, a transformer connected to energize said solenoids, energizing leads for said transformer connected in series through said thermal switches and said heater coils to said first and second power leads, and a third phase power lead connected to the remainder of the switches of said sets of switches.

6. A motor control and protector system comprising a motor having a winding, two sets of switches connected to selectively energize said winding for forward and reverse operation of the motor, a relay including solenoids arranged when energized to selectively actuate said sets of switches, holding circuits in said realy arranged to hold the solenoids in actuated position, a first thermal switch having a heater coil associated therewith and positioned within said motor, a first power lead connected in series through said heater coil and thermal switch to one switch of each set of said switches, a second thermal switch having a second heater coil associated therewith and positioned within said motor, a second power lead connected in series through said second heater coil and second thermal switch to other switches of each of said sets of switches, a transformer connected to energize said solenoids and holding circuits, and energizing leads for said transformer connected in series through said thermal switches and said heater coils to said power leads.

7. A motor control and protector system comprising a motor having a winding, two sets of switches connected to selectively energize said winding for forward and reverse operation of the motor, a relay including solenoids arranged when energized to selectively actuate said sets of switches, holding circuits arranged to hold the solenoids in actuated position, a first thermal switch having a heater associated therewith and positioned within said motor, a first power lead connected in series through said heater and thermal switch to one switch of each set of said switches, a second thermal switch having a second heater associated therewith and positioned within said motor, a second power lead connected in series through said second heater and its thermal switch to other switches of each set of said switches, a transformer connected to energize said solenoids and said holding circuits, and energizing leads for said transformer connected in series through one of said thermal switches to said power leads.

8. A motor control and protector system comprising a motor having a winding, two sets of switches connected to selectively energize said winding for forward and reverse operation of the motor, a relay including solenoids arranged when energized to selectively actuate said sets of switches, holding circuits arranged to hold the solenoids in actuated position, a first thermal switch having a heater associated therewith and positioned within said motor, a first power lead connected in series through said heater and said thermal switch to one switch of each set of said switches, a second power lead connected to other switches of each set of said switches, a transformer connected to energize said solenoids and said holding circuits, and energizing leads for said transformer connected through said heater and thermal switch to said power leads.

9. A motor control and protector system comprising a motor having running windings, sets of switches connected to selectively energize said windings for forward and reverse operation of the motor, solenoids arranged when energized to selectively actuate said set of switches, a thermal switch having a heater coil associated therewith and positioned within said motor, a first power lead connected in series through said heater coil and said thermal switch to one switch of each of said sets of switches, a second power lead connected to a second switch of each of said sets of switches, and energizing leads for said solenoids connected in series through said thermal switch and said heater coil to said power leads.

10. A motor control and protector system comprising a motor having running windings, a switch connected to energize said windings for operation of the motor, a solenoid arranged when energized to actuate said switch, a holding circuit arranged to hold the solenoid in actuated position, a thermal switch having heater associated therewith and positioned within said motor, a first power lead connected in series through said heater and thermal switch to said first switch, a second power lead connected to said windings, and energizing leads for said solenoid and holding circuit connected in series through said thermal switch to said power leads.

No references cited.